July 4, 1933.  J. V. DYRR  1,916,721
INTERGEARED OFFSET DISK HARROW
Filed June 15, 1931   3 Sheets-Sheet 1

Inventor.
Jacob. V. Dyrr.
Attorney.

July 4, 1933. J. V. DYRR 1,916,721
INTERGEARED OFFSET DISK HARROW
Filed June 15, 1931 3 Sheets-Sheet 2
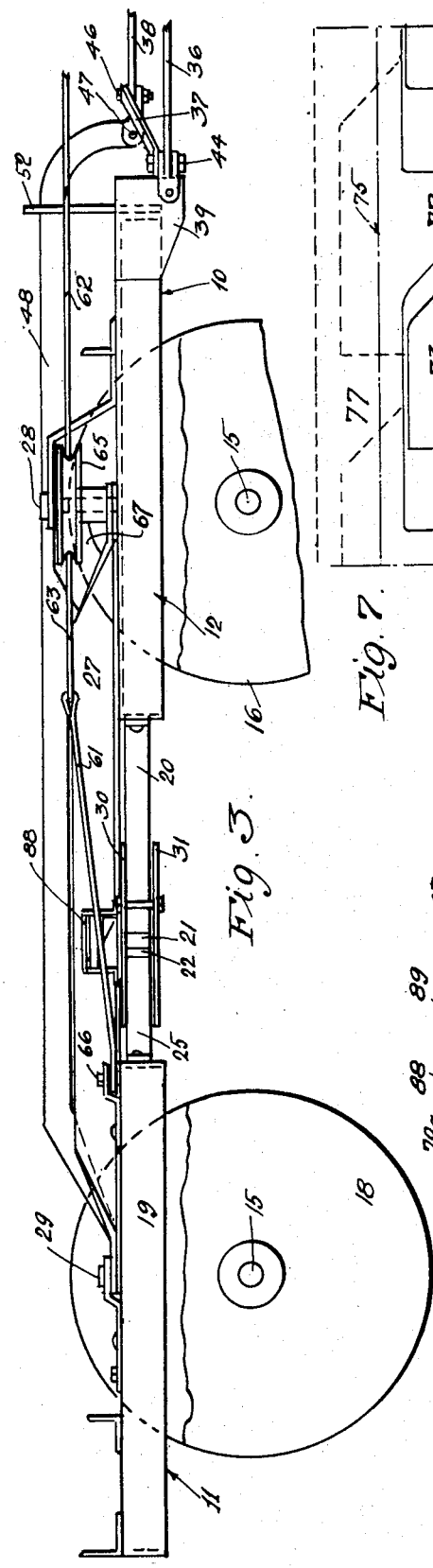
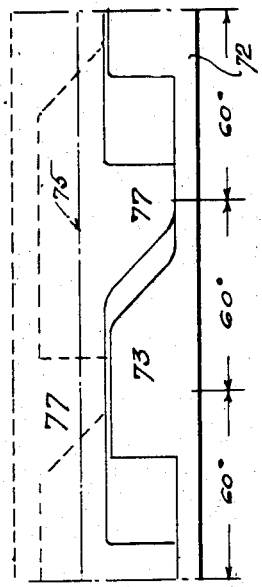
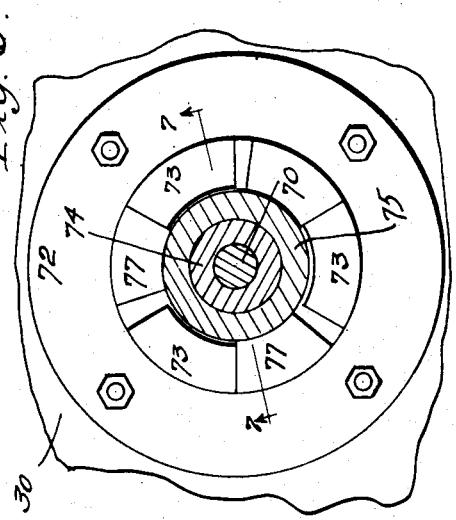
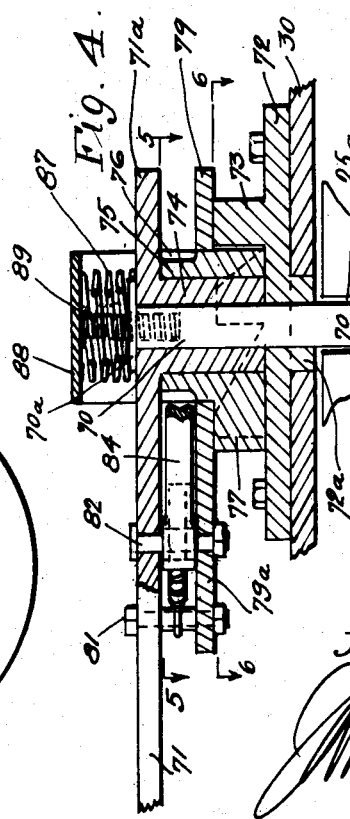
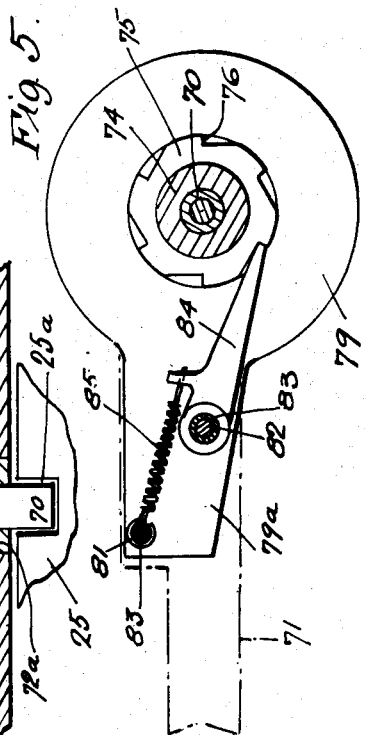
Inventor.
Jacob. V. Dyrr.
Attorney.

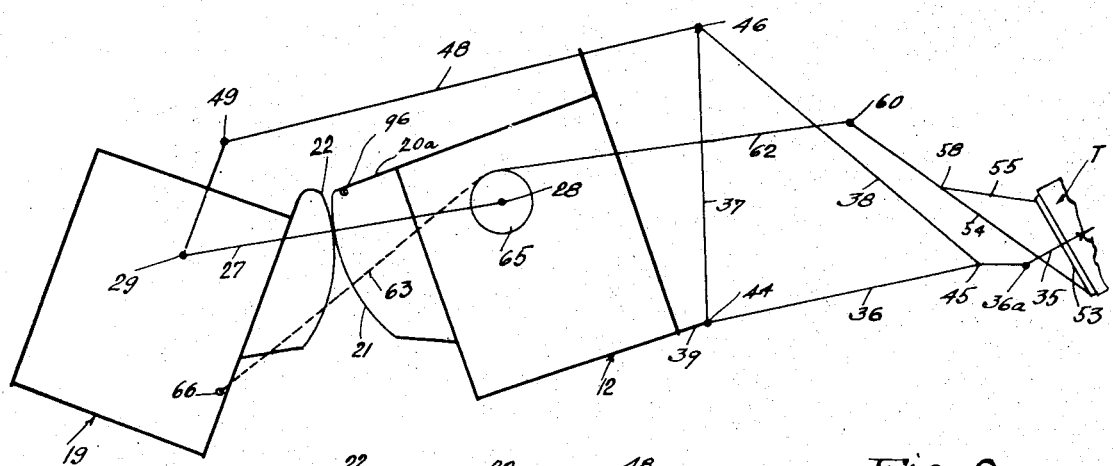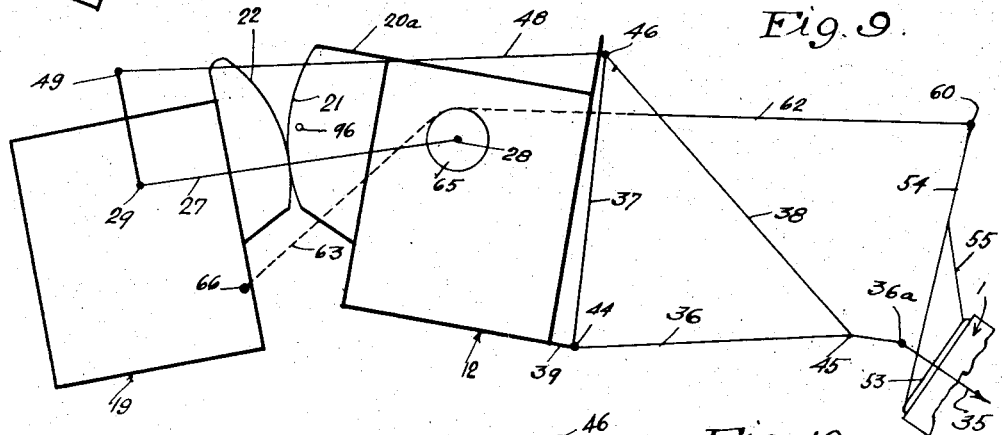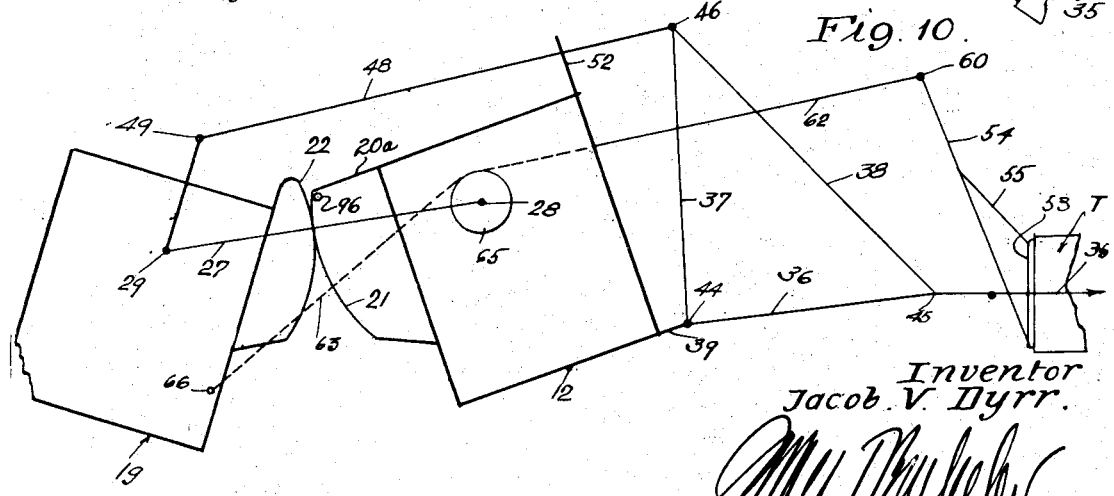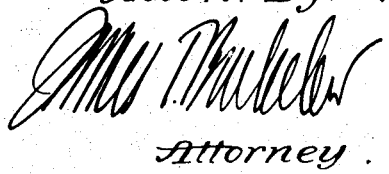

Patented July 4, 1933

1,916,721

UNITED STATES PATENT OFFICE

JACOB V. DYRR, OF BELL, CALIFORNIA

INTERGEARED OFFSET DISK HARROW

Application filed June 15, 1931. Serial No. 544,354.

This invention has to do with ground working devices of which harrows are typical, and more particularly with draft means for such harrows as comprise a pair of gangs in tandem arranged to be pulled either directly behind or to one side of the tractive means.

In harrows of this type, each gang usually consists of a series of concavo-convex disks mounted on an axle carried on a frame. The rear gang is pivotally connected to the front gang so that there may be relative motion between the two gangs. The front gang is brought into the operative position by inclining the gang so that the disks are at an angle to the direction of travel instead of parallel thereto. The pivotal connection of the rear gang to the front gang permits it to assume a similar inclined position, except that the inclination is opposite relative to the line of travel, and with its disks traveling in the spaces between the disks of the front gang. The disks of one gang are faced oppositely to those of the other to neutralize the side thrust resulting from the soil pressures on the concave side of the disks, for it is clear that unbalanced side thrust will cause the gangs to travel in other than the desired path.

Considerable difficulty has heretofore been encountered in controlling the inclinations of the two gangs. The most efficient working position is obtained when the inclinations of the gangs are equal for in this position the side thrust on the harrow as a whole is most nearly neutralized, the gang combination travels in a true line, the disks of the rear gang properly travel the interdisk spaces of the front gang, and the amount of soil worked and consequently the work done by each gang is most nearly equal. The situation has been met generally either by providing a rigid harrow frame with lever arrangements that move the two gangs to equal angles and lock them in that position, or by setting the front gang by adjusting the draft means and then allowing the rear gang to drop back into some desired position in which it is locked by stay bars.

The first method requires that the operator make all changes in the position of the gangs and so lacks flexibility—the gangs cannot automatically change position to meet varying soil conditions, turn corners, back up, and the like. The second method is open to the same objections, and is additionally objectionable because it permits one gang to move without changing the position of the other. This lack of inter-action between gangs results in the tendency for the rear gang to close up on the front one when in hard soil and so do less work, and to drag behind in soft soil and so cause an excessively heavy load in proportion to the work done.

In turning at the end of the row, a left turn can be made with the gang in working position, but in a right turn difficulty is encountered with the conventional type harrow unless the gangs can be closed up on each other to a substantially parallel position. Turns to the right are especially difficult for harrows are normally made with the front gang disks concave to the right and the rear gang disks concave to the left; the soil pressure on both gangs is then against the concave side of the disks and resists the turning movement. The common practice under such conditions is to close up the gangs by backing until they can be locked in a parallel position, and then to go forward, making the turn with the gangs so locked. After the turn is completed, the gangs are unlocked and opened to their normal working position as before. Such a procedure is bothersome and time consuming, and can be eliminated only by providing means to automatically position the gangs as the tractor turns.

Hence, it is a general object of my invention to provide draft means to connect the harrow to the tractor and to interconnect the gangs so that the gangs automatically assume equal inclination to the line of draft when normally operating and will assume suitable positions to permit a right or left hand turn. This permits the gangs to follow the tractor around a turn and to straighten out to a working position without regulation by the operator. The interconnection of the gangs is preferably such as to cause the two gangs to cooperate in their movements so that a shift in the position of one causes a similar shift of the other to keep them in the most efficient relative position with the loads evenly distributed.

This cooperating action of the gangs not only moves them to a position enabling a right hand turn to be made, but moves them to a position that allows the rear gang to work the soil on a left hand turn. On such a turn, the rear gang assumes a position that causes the disks to be inclined to the direction of gang movement and so that as the gang rounds the turn the disks are working the soil.

It is also an object of my invention to provide a draft means having the above characteristics that operates with the gangs off-set from the tractor as well as when they are directly behind, for the proper balancing of side thrust and positioning of the gangs for turning is often more difficult in the off-set position.

I provide a gear segment on each of the gangs meshing with the other segment so that the movement of either gang effects a corresponding movement of the other. The gangs are pulled by a draft frame having a single attachment with each gang at the opposite ends in a manner to aid in the positioning of the gangs. In conjunction with the gear segments and draft frame is a control means to open and close the gangs to obtain the proper angle relative to the line of draft for various working conditions and for making turns either to the right or left.

A better and more complete understanding of the manner in which I attain these and other objects of my invention and of the advantages thereof, may be had by reference to the drawings and following specification wherein I show and describe a present preferred form of my invention.

In the drawings:—

Fig. 3 is an enlarged side elevation of Fig. 1;

Fig. 4 is a fragmentary vertical section of the locking device on line 4—4 of Fig. 1;

Fig. 5 is a plan view on line 5—5 of Fig. 4;

Fig. 6 is a sectional view on line 6—6 of Fig. 4;

Fig. 7 is a developed diagrammatic elevation of one half of the cams and teeth as viewed on line 7—7 of Fig. 6;

Fig. 8 is a diagrammatic plan view of the harrow showing the position of the gangs and draft linkage when a left hand turn is being made;

Fig. 9 is a view similar to Fig. 8 showing a right hand turn;

Fig. 10 is a view similar to Fig. 8 showing the normal working position.

Figure 1:
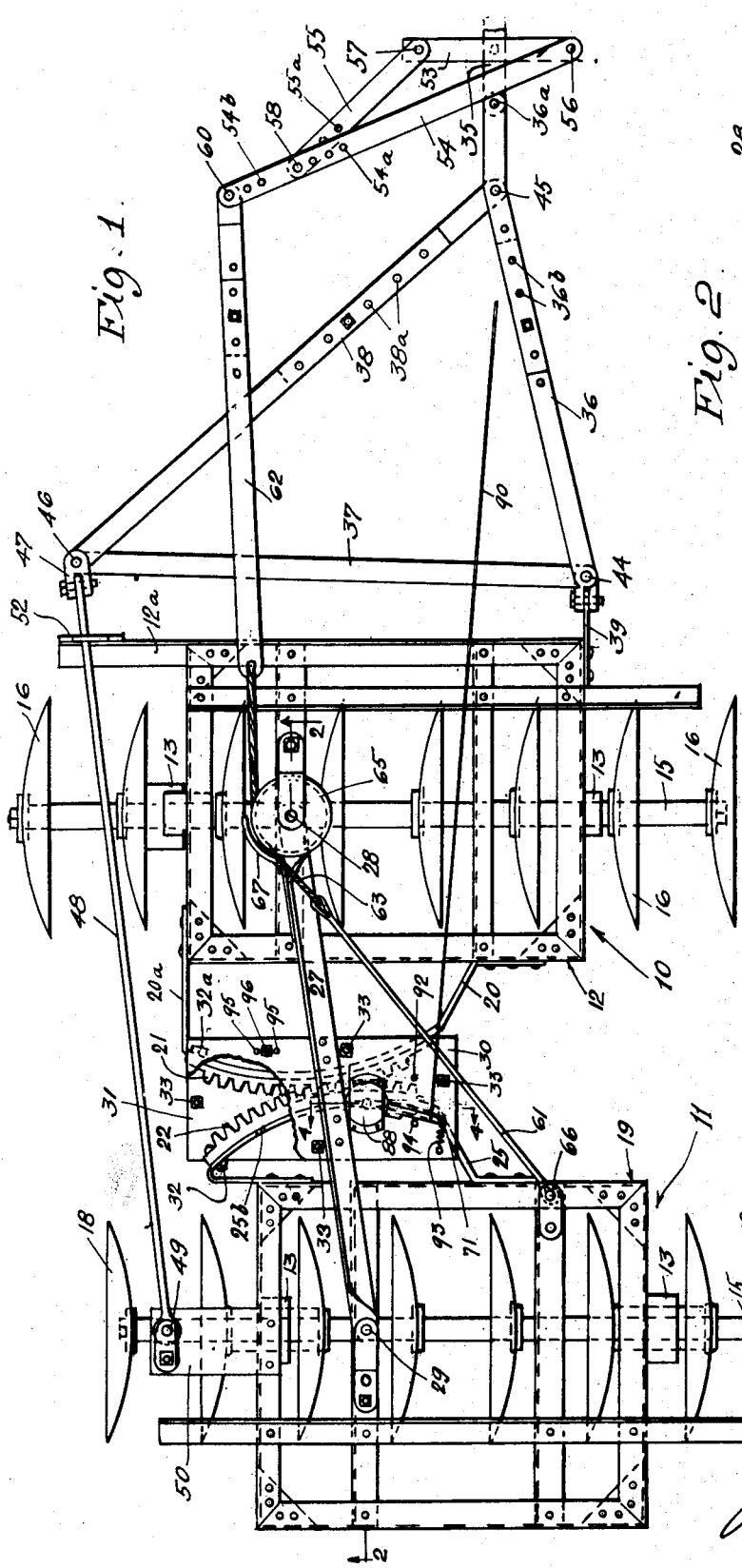
Fig. 1 is a plan view of a tandem harrow constructed according to my invention.
Figure 2:
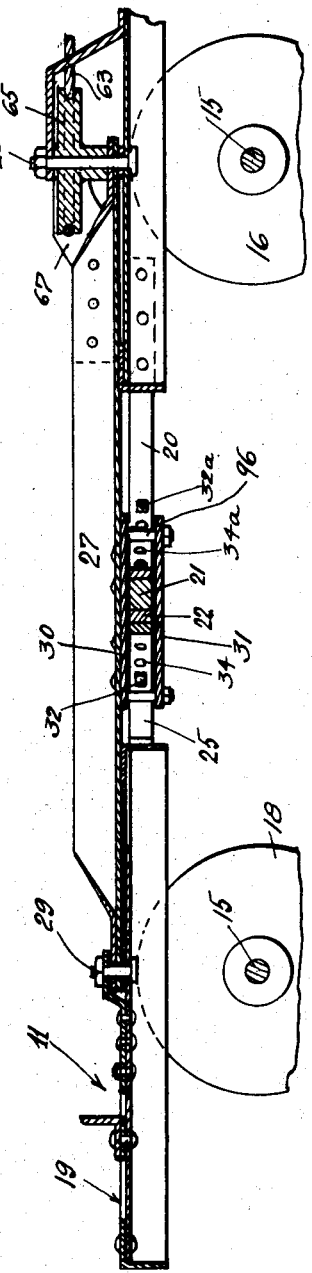
Fig. 2 is an enlarged vertical section on line 2—2 of Fig. 1.

Referring especially to Figs. 1, 2, 3, it is seen that the harrow has front and rear gangs, 10 and 11 respectively, of any suitable construction. Front gang 10 comprises rectangular frame 12 carrying bearings 13 in which is journaled axle 15. Disks 16 mounted on axle 15 are of any conventional type and are here shown as concave toward the right as is common practice. Rear gang 11 is of similar construction except that disks 18 on frame 19 are concaved oppositely to those of the front gang. For purposes of describing the present invention, only a conventional showing of the disks and axles is made, but insofar as the invention is concerned the mounting of the axles, disks, and bearings may be of any type desired.

Attached to bracket 20 extending rearwardly from frame 12, is gear segment 21 meshing with a similar segment 22 on bracket 25 extending forwardly from frame 19. The gear segments are kept radially meshed by radius bar 27 pivotally secured to the front gang by pin 28 and to the rear gang by pin 29, the points 28 and 29 being the centers of gear segments 21 and 22 respectively, so that they may freely rock one on the other and radius bar 27 moves to remain directly above the point of contact.

Adjustment of the gangs to secure relative lateral offset may be secured by unpinning one of bolts 28 or 29 and changing the tooth engagement of the segments or by shifting one or both of the segments along the brackets 20 and 25 which are made concentric with the segment centers. To enable this shifting of the segments along the brackets without removing pin 28 or 29, a plurality of bolt holes 34 and 34a are provided in the brackets so that bolts 32 and 32a may be removed, the segments shifted, and the bolts re-inserted in a suitable hole.

Horizontally extending housing plate 30 is riveted to the radius bar above the gear segments and a similar plate 31 is bolted to the upper plate by bolts 33. The two plates thus form a housing to keep the gear segments axially meshed, and also provide sufficient bearing against the segments and brackets 20 and 25 to prevent vertical displacement of one gang with respect to the other. Since the plates are fixed to the radius bar it is evident that they move relative to the gear segments and supporting brackets.

The harrow is attached to the draw bar 35, preferably fixed, of a tractor, by means of a triangular draft frame comprising longitudinal draft bar 36, transverse spreader bar 37, and diagonal draft bar 38. Bar 36 is pivoted at its forward end at 36a to the draw-bar 35 and is pivotally attached at its rearward end to bracket 39 on the front gang frame. Bars 37 and 38 are pinned to bar 36 at 44 and 45 respectively, and to each other at 46. A clevis bracket 47 secures pull rod 48 to the draft frame at pin 46, the rear end of rod 48 being pivoted at 49 to bracket 50 on the rear gang frame at or near the left hand end. A guide 52 is mounted on an extension 12a of frame 12 to support and guide the forward end of pull rod 48. The triangular frame formed by bars 36, 37, 38 is rigid but can be adjusted in size and shape since bars 36 and 38 are each made of two parts bolted together and a plurality of holes 36b and 38a provided in them to allow the bars to be lengthened or shortened as required. The size and shape of the draft frame will determine the lateral position of the harrow behind the tractor, i. e., the amount of offset, if any.

Bar 53 as well as drawbar 35 is fixed and is stationary with reference to the tractor, the rear end of which is shown diagrammatically at T in Figs. 8, 9, 10. Arm 54 and brace 55 are attached at 56 and 57 to the opposite ends of bar 53 and are fastened together at 58 to form a rigid triangle. Attached to the end of arm 54 at 60, is the control line here shown as made of rod 61 and bar 62 joined by cable 63 passing around sheave 65. Sheave 65, or other suitable guide, may conveniently be mounted on pin 28. Rod 61 is secured to frame 19 at 66 near the end opposite to the pull rod 48. Guard 67 is mounted on radius bar 27 to keep the cable on sheave 65. This control line serves to close or open the two gangs as will be explained later, and may be made of a cable alone except that bar 62, by being in two pieces bolted together, provides a convenient means of adjusting the length of the line. The forward end of the line, pin 60, is held fixed with regard to pin 36a by the provision of the brace 55 for arm 54. Members 55 and 54 are provided with a plurality of holes 55a and 54a to receive pin 58 to change the position of pin 60 and, together with holes 54b to receive pin 60, provide means to shift pin 60 to obtain the desired motion of the control line. Bar 62 may, in some instances, be fastened directly to the tractor, though the method described is preferred because of the adjustability so obtained.

As a means for locking the gangs in position, the locking pin and mechanism illustrated in Figs. 4, 5, and 6 is mounted on the top housing plate 30 so that pin 70 is directly above bracket 25. The mechanism provided is so designed that strokes of the horizontally extending operating handle 71 alternately raise and lower locking pin 70 as will now be explained.

Base 72, bolted to upper housing plate 30, has on its upper surface integral projections forming the fixed cams 73, and on the lower surface, a boss 72a fitting into an aperture in plate 30 to provide a suitable bearing for pin 70. Surrounding the locking pin above base 72, is a sleeve 74 cast integrally with the annular inner end 71a of the operating handle. The external surface of sleeve 74 serves as a bearing on which turns a second sleeve 75 which has ratchet teeth 76 (Figs. 4 and 5) cut into the upper portion of its periphery and has horizontally projecting cam followers 77 on the lower portion, followers 77 being adapted to ride over cams 73.

In the position of Fig. 4, the heights of followers 77 and cams 73 above base 72 are equal and on their upper surfaces is supported an annular member 79 having a short arm 79a that projects beneath the operating handle. The arm and handle are fastened together by bolts 81 and 82, spacers 83 being used to keep the proper interval between the two arms. Bolt 82 acts as a pivot for pawl 84 which is adapted to engage ratchet teeth 76 to cause sleeve 75 to rotate counter-clockwise of Fig. 5 when the operating handle is moved in the same direction forwardly, as the device is mounted on the harrow. Spring 85 is secured to pawl 84 and bolt 81 to keep the pawl in engagement with the ratchet teeth.

The pin operating mechanism is retained in assembled position by pressure of spring 87 on the inner end 71a of the operating handle, the spring being confined beneath a U-shaped strap 88 secured to base 72. A second and smaller spring 89 within spring 87 is seated in a bore in pin 70 and presses against strap 88, the flanged head 70a of the locking pin limiting its downward movement. This dual spring construction resiliently holds the parts in assembled position and urges them to the position of Fig. 4 and yet the pin alone or the entire mechanism may be raised as will now be explained.

The position of Fig. 4 is the locking position with pin 70 down and engaging notch 25a in the top edge of bracket 25 so that the plate 30 is locked relative to the gear segment. To unlock the plate and gear segment, handle 71 is moved in a counter-clockwise direction by the operator pulling on rope 90, and, by the engagement of pawl 84 in one of teeth 76, sleeve 75 is rotated in the same direction. The rotation of the sleeve moves followers 77 up and onto cams 73 as shown by the dotted lines in Fig. 7 where the profile of the cams and followers is illustrated. This raises the entire mechanism, compressing springs 87 and 89, so that pin 70 clears the bracket and permits motion of the housing plate relative to the gear segments.

At the end of the forward stroke, handle 71 strikes a stop 92 and the operator releases the rope to allow spring 93, attached to plate 30, to return handle 71 to its initial position against stop 94. Sleeve 75 is held from reverse rotation by the frictional engagement of followers 77 on the top surfaces of cams 73 as a result of the pressure of spring 87. The next time that the handle 71 is actuated, pawl 84 again engages a tooth 76 to rotate sleeve 75 and the followers again advance, counter-clockwise, so that they occupy positions intermediate the cams 73 as shown by the full line position of Fig. 7. The pin lifting mechanism is returned to the position of Fig. 4 by spring 87 and the locking pin is riding along the top of bracket 25 under pressure of spring 89, ready to drop into any notch that is moved into register.

The cams 73 are here shown as three in number and equally spaced angularly (Fig. 6) with the cooperating followers 77 equal in number and spacing. Thus by rotating the followers through 60° they move from between cams 73 up onto them, and a succeeding 60° movement moves them off the cams back to the lower position. To effect this 60° movement, the upper end of sleeve 75 is provided with six ratchet teeth 76, and stops 92 and 94 are so spaced as to allow the operating handle to move one-sixth of a revolution. In this manner, pin 70 is alternately raised and lowered by successive movements of handle 71 through 60°; and it will be clearly seen that any other suitable number of cams and followers and a corresponding number of ratchet teeth might be used to obtain the same movement of pin 70 in a greater or lesser fraction of a revolution as desired.

Having set forth a preferred form of draft means and described the operation of the locking pin, I shall now describe the operation of the harrow when in use.

Fig. 1 shows the harrow with the gangs parallel, a position that is used only when the harrow is being moved without working the soil. In order to maintain the gangs in this parallel or inoperative position, they are locked by means of pin 70 in notch 25a as described. When it is desired to have the disks work the soil, pin 70 is raised and the rear gang naturally opens on the front one until the two gangs assume some normal working position of which the one shown in Fig. 10 is typical. The exact angle between gangs depends on the nature of the soil, being greatest in soft soils where the penetration of the disks is greatest.

The extent to which the gangs open on each other may be limited by the use of the control line and is adjusted by changing the length of bar 62. In average soils when the gangs open as in Fig. 10, the control line is taut and is holding the rear gang against dropping farther back. It is obvious then that when the gangs are parallel and the tractor pulling straight ahead that the control line will be slack, the slackness being cared for by the flexible cable portion 63.

As the rear gang opens it tends to pivot about the disks because of their resistance to endwise movement, rather than about the gear segment, with the result that the movement of the rear segment turns the front segment about its center and the front gang turns an amount approximately equal to that of the rear gang. The tendency of either gang to assume an angular position is transmitted to the other so that the angles of the gang with the line of draft are equal, but it is desired that the rear gang have an advantage; consequently, the rear segment is preferably made with a shorter radius than the front one so that a mechanical advantage is obtained to aid in swinging the front gang. Since, angular movement of either gang produces a corresponding and opposite movement of the other, the two gangs are always in the most efficient relative positions. It is sometimes desirable to lock the gangs in the normal working position and for this purpose notch 25b (Fig. 1) to receive pin 70 is provided at the proper point on bracket 25. It is evident that as many notches, other than 25a and 25b, may be provided as are desired to permit the locking of the gangs in the corresponding desired positions.

When a left hand turn is made the gangs open farther to the position of Fig. 8. The swing of the tractor moves arm 54 and consequently pin 60 to the rear so that, on a sharp turn, all tension in the control line is released. In a less sharp turn, there may be no actual slack in cable 63 but the rear gang is merely permitted to open further. To limit the backward swing of the rear gang, a series of holes 95 (Fig. 1) in housing plates 30 and 31 are provided to receive a stop pin 96 which swings against the rearwardly extending portion 20a of the bracket 20 as in Fig. 8. The rear gang is thus opened sufficiently so that it works the soil as it is turned, instead of merely trailing around the curve.

During a sharp right hand turn the gangs close up as shown in Fig. 9. The turning of the tractor swings arm 54 and pivot 60 forward so that the control line pulls up the rear gang. The amount that the gangs close is automatically regulated by the sharpness of the turn; and they may pass through the parallel position to the position illustrated on a sufficiently short turn. The axles of the gangs thus converge toward the center of the turn and the gangs follow the tractor without setting up excessive side thrust and without any regulation by the operator.

The positions assumed on turns by the gangs may be regulated by changing the position of pin 60 relative to pin 36a. By adjusting the arm 54 and brace 55, pin 60 may be made to move on a longer or shorter radius so that the movement of the control line is increased or decreased on the turns. While drawbar 35 is preferably fixed so that the distance between pins 36a and 60 is constant a swinging drawbar may be used, the operation of the harrow being the same, and the position of pin 60 changed to compensate for the drawbar swing. Also, when the harrow is offset to one side or the other, the position of pin 60 and the length of bar 62 may be adjusted to secure suitable opening and closing of the gangs. The adjustment of arm 54 and brace 55 to adjust pin 60 coordinates with the position of pin 36a to secure the desired operation of the harrow.

When the tractor backs up with the gangs open, the tendency is first for the gangs to close upon each other rather than to move backwards. If the locking pin has been released and is riding along the edge of bracket 25, the gangs may be thus closed until the pin drops into notch 25a and locks the gangs in parallel so that they may be pushed backwards. This is a convenient way of bringing the gangs in parallel for transporting them, though the same result may be secured by executing a sharp right turn that will close the gangs to the desired position in which they may be locked.

It will be understood that the foregoing description and drawings are to be considered as illustrative of rather than restrictive upon my invention, for various changes in design, arrangement, and construction may be made without departing from the spirit of my invention.

This application is in part a continuation of applicant's copending application, Ser. No. 512,877, filed Feb. 2, 1931, the subject matter of the two applications being similar. Between the two applications, generic claims and claims to common subject matter are carried by the present application, while claims in said earlier copending application are limited to specific features peculiar to a showing of that case alone.

I claim:—

1. A ground working implement comprising forward and rearward framed gangs of ground working tools, means interconnecting the gangs for relative movement in a horizontal plane and including a pair of contacting rolling surfaces restricting such relative movement to a rolling movement, means for holding the rolling surfaces in contact, and draft means for the gangs.

2. A ground working implement comprising forward and rearward framed gangs of ground working tools, intermeshing gear segments mounted on the respective gangs to roll one on the other in a substantially horizontal plane, means for holding the gear segments radially and axially in mesh, and draft means for the gangs.

3. A ground working implement comprising forward and rearward framed gangs of ground working tools, intermeshing gear segments mounted on the respective gangs to roll one on the other in a substantially horizontal plane, a radius bar connecting the two gangs at points concentric with the gear segments, and draft means for the gangs.

4. A ground working implement comprising forward and rearward framed gangs of ground working tools, means interconnecting the gangs for relative movement in a horizontal plane and including a pair of contacting rolling surfaces restricting such relative movement to a rolling movement, a radius bar connecting the two gangs at points concentric with the rolling surfaces, means confining the surfaces vertically, and draft means for the gangs.

5. A ground working implement comprising forward and rearward framed gangs of ground working tools, intermeshing gear segments mounted on the respective gangs to roll one on the other in a substantially horizontal plane, means for holding the gear segments in mesh, horizontal plates confining the gears vertically, and draft means for the gangs.

6. A ground working implement comprising forward and rearward framed gangs of ground working tools, intermeshing gear segments mounted on the respective gangs to roll one on the other in a substantially horizontal plane, a radius bar connecting the two gangs at points concentric with the gear segments, horizontal plates mounted on the radius bar and confining the gears vertically, and draft means for the gangs.

7. A ground working implement comprising forward and rearward framed gangs of ground working tools, means interconnecting the gangs for relative movement in a horizontal plane and including a pair of contacting rolling surfaces restricting such relative movement to a rolling movement, means for holding the rolling surfaces in contact, and draft means connecting to both gangs.

8. A ground working implement comprising forward and rearward framed gangs of ground working tools, intermeshing gear segments mounted on the respective gangs to roll one on the other in a substantially horizontal plane, said segments being located at one side of the transverse centers of the gangs, means for holding the gear segments in mesh, and draft means connecting to the forward gang toward the end opposite the gear segments and to the rear gang toward the end near the gear segments.

9. A ground working implement comprising forward and rearward framed gangs of ground working tools, intermeshing gear segments mounted on the respective gangs to roll one on the other in a substantially horizontal plane, said segments being located at one side of the transverse centers of the gangs, means for holding the gear segments in mesh, and draft means for the gangs; said draft means comprising a longitudinal draft bar pivotally attached to the forward gang toward the end opposite the gear segments, a diagonal draft bar, a spreader bar connected to and spacing the longitudinal and diagonal draft bars, and a pull rod pivotally connecting the diagonal draft bar to the rear gang toward the end near the gear segments, the longitudinal and diagonal draft bars being adjustable in length.

10. A tractor operated ground working implement comprising forward and rearward framed gangs of ground working tools, intermeshing gear segments mounted on the respective gangs to roll one on the other in a substantially horizontal plane, draft means for the gangs, and control means comprising a connection member connected with the tractor and laterally offset with relation to the draft connection point and pulling connective means between the offset member and the rear gang connected to the rear gang at a point laterally removed from the gear center thereon.

11. A tractor operated ground working implement comprising forward and rearward framed gangs of ground working tools, means interconnecting the gangs for relative movement in a horizontal plane and including a pair of contacting rolling surfaces restricting such relative movement to a rolling movement, draft means connecting to both gangs, and control means comprising a connection member connected with the tractor and laterally offset with relation to the draft connection point and pulling connective means between the offset member and the rear gang connected to the rear gang at a point laterally removed from the center of the rolling surface thereon.

12. A tractor operated ground working implement comprising, forward and rearward framed gangs of ground working tools, intermeshing gear segments mounted on the respective gangs to roll one on the other in a substantially horizontal plane, said segments being located at one side of the transverse centers of the gangs, draft means connecting to the forward gang toward the end opposite the gear segments and to the rear gang toward the end near the gear segments, and control means comprising a connection member connected with the tractor and laterally offset with relation to the draft connection point and pulling connective means between the offset member and the rear gang connected to the rear gang near the end opposite the gear segment.

13. A tractor operated ground working implement comprsing forward and rearward framed gangs of ground working tools; intermeshing gear segments mounted on the respective gangs to roll one on the other in a substantially horizontal plane, said segments being located at one side of the transverse centers of the gangs; draft means for the gangs; said draft means comprising a longitudinal draft bar pivotally attached to the forward gang toward the end opposite the gear segments, a diagonal draft bar, a spreader bar connected to and spacing the longitudinal and diagonal draft bars, and a pull rod pivotally connecting the diagonal draft bar to the rear gang toward the end near the gear segments, the longitudinal and diagonal draft bars being adjustable in length; and control means connected with the tractor at a point laterally offset with relation to the draft connection point comprising pulling connective means between the tractor and the rear gang connected to the rear gang near the end opposite the gear segment.

14. A tractor operated ground working implement comprising forward and rearward framed gangs of ground working tools, intermeshing gear segments mounted on the respective gangs to roll one on the other in a substantially horizontal plane, draft means for the gangs, and control means comprising a connection member connected with the tractor and laterally offset with relation to the draft connection point and pulling connective means between the offset member and the rear gang connected to the rear gang at a point laterally removed from the gear center thereon, said pulling means passing around a sheave mounted on the center of the front gear segment.

15. A tractor operated ground working implement comprising, forward and rearward framed gangs of ground working tools, intermeshing gear segments mounted on the respective gangs to roll one on the other in a substantially horizontal plane, said segments being located at one side of the transverse centers of the gangs, draft means connecting to the forward gang toward the end opposite the gear segments and to the rear gang toward the end near the gear segment, and control means comprising a connection member connected with the tractor and laterally offset with relation to the draft connection point and pulling connective means between the offset member and the rear gang connected to the rear gang near the end opposite the gear segment, said pulling means passing around a guide mounted on the center of front gear segment.

16. A ground working implement comprising forward and rearward framed gangs of ground working tools, means interconnecting the gangs for relative movement in a horizontal plane and including a pair of contacting rolling surfaces restricting such relative movement to a rolling movement, draft means for the gangs, and locking means adapted to lock the rolling surfaces together.

17. A ground working implement comprising forward and rearward framed gangs of ground working tools, intermeshing gear segments mounted on the respective gangs to roll one on the other in a substantially horizontal plane, draft means for the gangs, and locking means adapted to lock the gear segments together selectively in any one of a number of relative rolling positions.

18. A ground working implement comprising forward and rearward framed gangs of ground working tools, intermeshing gear segments mounted on the respective gangs to roll one on the other in a substantially horizontal plane, horizontal plates confining the gear segments vertically, draft means for the gangs, and locking means mounted on one of the horizontal gear confining plates and adapted to engage one of the gear segments to lock the gear segments against relative movement.

19. A ground working implement comprising forward and rearward framed gangs of ground working tools, intermeshing gear segments mounted on the respective gangs to roll one on the other in a substantially horizontal plane, a radius bar connecting the two gangs at points concentric with the gear segments, horizontal plates mounted on the radius bar and confining the gears vertically, draft means for the gangs, and locking means mounted on one of the horizontal gear segment confining plates and adapted to engage one of the gear segments to lock the gear segments against relative movement.

20. A ground working implement comprising forward and rearward framed gangs of ground working tools, intermeshing gear segments mounted on the respective gangs to roll one on the other in a substantially horizontal plane, one of the gear segments being provided with a plurality of notches spaced along its length, locking means adapted selectively to engage said notches, and draft means for the gangs.

21. A ground working implement comprising forward and rearward framed gangs of ground working tools, intermeshing gear segments mounted on the respective gangs to roll one on the other in a substantially horizontal plane, horizontal plates confining the gears vertically, one of the gear segments being provided with a plurality of notches spaced along its length, and locking means mounted on one of the horizontal gear segment confining plates adapted selectively to engage said notches.

22. A ground working implement comprising forward and rearward framed gangs of ground working tools, intermeshing gear segments mounted on the respective gangs to roll one on the other in a substantially horizontal plane, a radius bar connecting the two gangs at points concentric with the gear segments, horizontal plates mounted on the radius bar and confining the gears vertically, one of the gear segments being provided with a plurality of notches spaced along its length, and locking means mounted on one of the horizontal gear segment confining plates and adapted selectively to engage said notches.

23. A tractor operated ground working implement comprising forward and rearward framed gangs of ground working tools, means interconnecting the gangs for relative horizontal swinging movement, draft means connecting to both gangs, and control means comprising a connection bracket mounted on the tractor laterally offset with relation to the draft connection point and pulling connective means between the offset bracket and the rear gang connected to the rear gang at a point laterally removed from the gang interconnecting means.

24. A tractor operated ground working implement comprising forward and rearward framed gangs of ground working tools, means interconnecting the gangs for relative horizontal swinging movement, said interconnecting means being at one side of the transverse centers of the gangs, draft means for the gangs connecting to the forward gang toward the end opposite the gang interconnecting means and to the rear gang toward the end near the gang interconnecting means, and control means comprising a connection member connected with the tractor and laterally offset with relation to the draft connection point and pulling connective means between the offset member and the rear gang connected to the rear gang at a point laterally removed from the gang interconnecting means.

25. A tractor operated ground working implement comprising forward and rearward framed gangs of ground working tools; means interconnecting the gangs for relative horizontal swinging movement; draft means for the gangs, said draft means comprising a longitudinal draft bar pivotally attached to the forward gang toward the end opposite the interconnecting means, a diagonal draft bar, a spreader bar connected to and spacing the longitudinal and diagonal draft bars, and a pull rod pivotally connecting the diagonal draft bar to the rear gang toward the end near the interconnecting means, the longitudinal and diagonal draft bars being adjustable in length; and control means connected with the tractor at a point laterally offset with relation to the draft connection point comprising pulling connective means between the tractor and the rear gang connected to the rear gang at a point laterally removed from the gang interconnecting means.

26. A tractor operated ground working implement comprising forward and rearward framed gangs of ground working tools, means interconnecting the gangs for relative horizontal swinging movement, draft means for the gangs, and control means comprising an adjustable connection bracket mounted on the tractor laterally offset with relation to the draft connection point and adjustable pulling connective means between the offset bracket and the rear gang connected to the rear gang at a point laterally removed from the gang interconnecting means.

27. A tractor operated ground working implement comprising forward and rearward framed gangs of ground working tools, means interconnecting the gangs for relative horizontal swinging movement, said interconnecting means being at one side of the transverse centers of the gangs, draft means for the gangs connecting to the forward gang toward the end opposite the gang interconnecting means and to the rear gang toward the end near the gang interconnecting means, and control means comprising an adjustable connection bracket mounted on the tractor laterally offset with relation to the draft connection point and adjustable pulling connective means between the offset bracket and the rear gang connected to the rear gang at a point laterally removed from the gang interconnecting means.

28. In a ground working implement, the combination of two relatively shiftable gangs of ground working tools, and means for locking the gangs in fixed relative position embodying a locking mechanism movable with one gang and adapted alternately to engage and disengage the other gang on successive actuations.

29. In a ground working implement, the combination of two relatively shiftable gangs of ground working tools, and means for locking the gangs in fixed relative position embodying a locking mechanism movable with one gang and adapted alternately to engage and disengage the other gang on successive actuations; said locking means comprising a locking pin, a fixed cam plate, a relatively rotatable sleeve, cam followers on the sleeve, ratchet mechanism to rotate said sleeve, and an oscillatory actuating arm adapted to rotate said sleeve by means of the ratchet mechanism to cause the sleeve to raise and lower the locking pin.

30. In a ground working implement, the combination of two relatively shiftable gangs of ground working tools, intermeshing gear segments mounted on the respective gangs to roll one on the other in a substantially horizontal plane, horizontal plates confining the gear segments vertically, and means mounted on one of the gear segment confining plates and engaging one gear segment for locking the gangs in fixed relative positions embodying a locking mechanism movable with one gang and adapted alternately to engage and disengage the other gang on successive actuations.

31. In a ground working implement, the combination of two relatively shiftable gangs of ground working tools, intermeshing gear segments mounted on the respective gangs to roll one on the other in a substantially horizontal plane, horizontal plates confining the gear segments vertically, and means mounted on one of the gear segment confining plates and engaging one gear segment for locking the gangs in fixed relative positions embodying a locking mechanism movable with one gang and adapted alternately to engage and disengage the other gang on successive actuations; said locking means comprising a locking pin, a fixed cam plate, a relatively rotatable sleeve, cam followers on the sleeve, ratchet mechanism to rotate said sleeve, and an oscillatory actuating arm adapted to rotate said sleeve by means of the ratchet mechanism to cause the sleeve to raise and lower the locking pin.

32. In a ground working implement, the combination of two relatively shiftable gangs of ground working tools, intermeshing gear segments mounted on the respective gangs to roll one on the other in a substantially horizontal plane, a radius bar joining the gangs at points concentric with the gear segments, horizontal plates mounted on the radius bar and confining the gear segments vertically, and means mounted on one of the gear segment confirming plates and engaging one gear segment for locking the gangs in fixed relative positions embodying a locking mechanism movable with one gang and adapted alternately to engage and disengage the other gang on successive actuations.

33. A tractor operated ground working implement comprising forward and rearward framed gangs of ground working tools; means positioned at one side of the transverse centers of the gangs for interconnecting the gangs for relative horizontal swinging movement; draft means for the gangs; said draft means comprising a longitudinal draft bar pivotally attached to the forward gang toward the end opposite the interconnecting means, a diagonal draft bar, a spreader bar connected to and spacing the longitudinal and diagonal draft bars, and a pull rod pivotally connecting the diagonal draft bar to the rear gang toward the end near the interconnecting means; control means comprising a connection member connected with the tractor and laterally offset with relation to the draft connection point and pulling connective means between the offset member and the rear gang connected to the rear gang at a point laterally removed from the gang interconnecting means; said pulling connective means being of a length to permit the gangs to open up to a normal cutting position when the tractor is pulling straight ahead, and to permit the rear gang to open farther to a cutting position when the tractor turns to the left; and stop means to limit the distance the rear gang opens.

34. A tractor drawn ground working implement comprising forward and rearward framed gangs of ground working tools, intermeshing gear segments mounted on the respective gangs to roll one on the other in a substantially horizontal plane, draft means for the gangs, and control means including pulling connective means between the tractor and the rear gang, said pulling connective means being attached to the tractor at a point laterally removed in one direction from the draft connection point and attached to the rear gang at a point laterally removed in the opposite direction from the gear segments.

35. A tractor drawn ground working implement comprising forward and rearward framed gangs of ground working tools, means interconnecting the gangs for horizontal angular adjustment, draft means pivotally connected with the tractor and pivotally connected to the front gang, and adjusting means comprising a bar attached to the draft means and to the rear gang and a control member attached to the tractor at a point laterally removed from the draft connection and to the rear gang at a point laterally removed from the point of attachment of the bar.

36. A tractor drawn ground working implement comprising forward and rearward framed gangs of ground working tools, means interconnecting the gangs for horizontal angular adjustment, draft means pivotally connected with the tractor and pivotally connected to the front gang, and adjusting means comprising a bar attached to the draft means and to the rear gang and a control member attached to the tractor at a point laterally removed from the draft connection and to the rear gang, said bar and control member being attached to the rear gang at points laterally removed from and on opposite sides of the gang interconnecting means.

37. A tractor operated ground working implement comprising forward and rearward framed gangs of ground working tools, means interconnecting the gangs for relative horizontal swinging movement, draft means connected to the forward gang at a point laterally removed to one side from the swinging interconnection and connected to the rearward gang at a point oppositely laterally removed from the swinging interconnection; and control means comprising a connection member connected with the tractor and laterally offset with relation to the draft connection point, and pulling connective means between the offset member and the rear gang connected to the rear gang at a point laterally removed in the first mentioned direction from the swinging interconnection.

38. A ground working implement comprising forward and rearward framed gangs of ground working tools, intermeshing gear segments mounted on the respective gangs to roll one on the other in a substantially horizontal plane, and draft means connected to the forward gang at a point laterally removed to one side from the swinging interconnection and connected to the rear gang at a point oppositely laterally removed from the swinging interconnection.

39. A tractor operated ground working implement comprising forward and rearward framed gangs of ground working tools, means interconnecting the gangs for relative horizontal swinging movement, draft means for the gangs, and control means comprising a connection bracket mounted on the tractor laterally offset with relation to the draft connection point and a flexible tension member connected directly between the offset bracket and the rear gang, the point of connection to the rear gang being laterally removed from the gang interconnecting means in a direction opposite to that toward which the connection bracket is offset from the draft connection.

40. A tractor operated ground working implement comprising forward and rearward framed gangs of ground working tools, means interconnecting the gangs for relative horizontal swinging movement, draft means for the gangs, and control means comprising a connection bracket mounted on the tractor laterally offset with relation to the draft connection point and a flexible tension member connected directly between the offset bracket and the rear gang.

41. A ground working implement comprising forward and rearward framed gangs of ground working tools, intermeshing gear segments mounted on the respective gangs to roll one on the other in a substantially horizontal plane, a radius bar connecting the two gangs at points concentric with the gear segments, draft means for the gangs, and locking means adapted temporarily to lock the frames against relative movement.

In witness that I claim the foregoing I have hereunto subscribed my name this 3rd day of June 1931.

JACOB V. DYRR.